United States Patent [19]

Yokota et al.

[11] 4,402,020

[45] Aug. 30, 1983

[54] LOCK-RELEASING MECHANISM FOR MAGNETIC RECORD/PLAYBACK APPARATUS

[75] Inventors: Tadashi Yokota; Wataru Watanabe, both of Saitama, Japan

[73] Assignee: Clarion Co., Ltd., Tokyo, Japan

[21] Appl. No.: 236,836

[22] Filed: Feb. 23, 1981

[30] Foreign Application Priority Data

Feb. 25, 1980 [JP] Japan ............................ 55-22366[U]

[51] Int. Cl.³ ...................... G11B 15/18; G11B 15/48
[52] U.S. Cl. .................................. 360/72.1; 360/74.1
[58] Field of Search ...................... 360/71, 72, 74, 62; 242/200–206

[56] References Cited

U.S. PATENT DOCUMENTS 3,533,633 10/1970 Wilder .............................. 360/74.1
4,115,822 9/1978 Kitazawa et al. .................. 360/74.2

*Primary Examiner*—Alfred H. Eddleman
*Assistant Examiner*—Kin Wong
*Attorney, Agent, or Firm*—Wallenstein, Wagner, Hattis, Strampel & Aubel

[57] ABSTRACT

A lock-releasing mechanism for a magnetic record/-playback apparatus wherein one plunger is used for changeover of an auto-reverse mechanism and lock-release of FF- and/or REW-operating rod for an automatic music sensor. The lock-releasing mechanism includes a stopper interlocked with the FF- and/or REW-operating rod so as to restrict the pulling stroke of the plunger when the FF- and/or REW-operating rod is locked.

3 Claims, 3 Drawing Figures

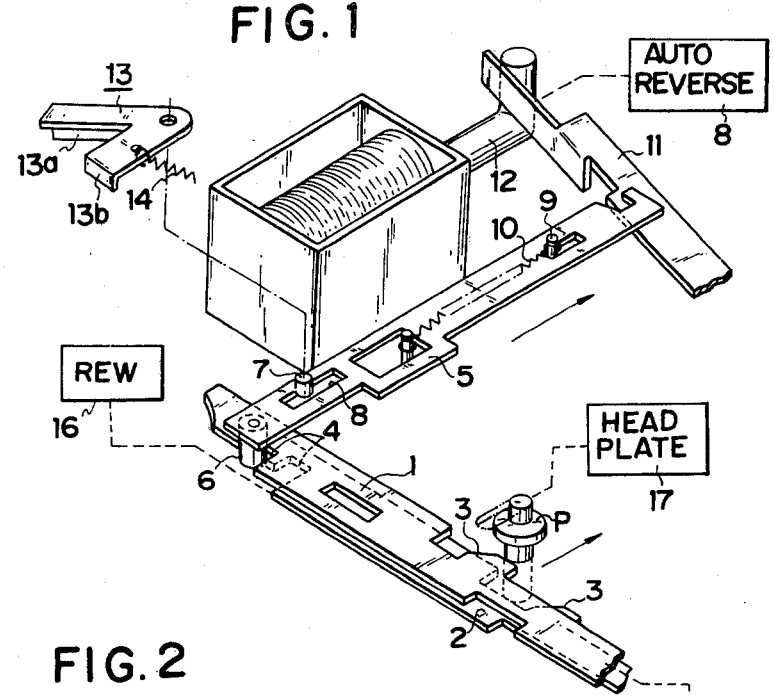
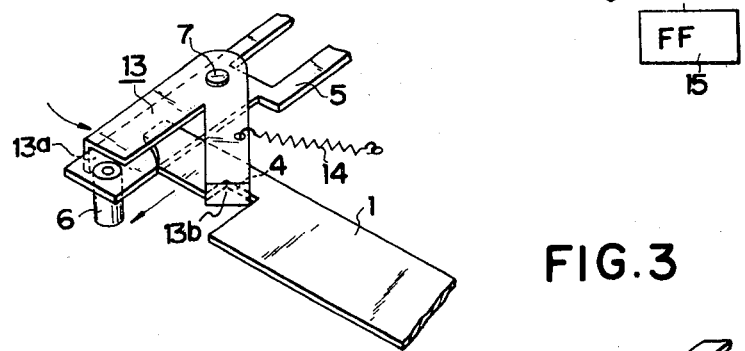
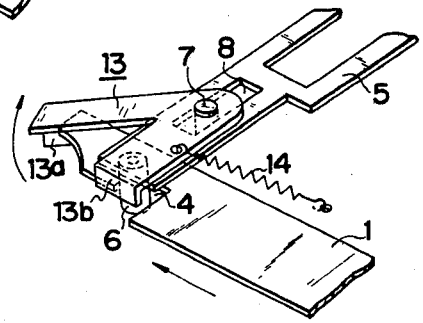

LOCK-RELEASING MECHANISM FOR MAGNETIC RECORD/PLAYBACK APPARATUS

BACKGROUND OF THE INVENTION

Field of the Invention

This invention relates to a lock-releasing mechanism for a magnetic record/playback apparatus, and more particularly to a lock-releasing mechanism for an automatic music sensing mechanism, which is adapted to reset an operating rod locked in an automatic music sensing mode position to an ordinary playback mode position.

To select a desired music from plural musics recorded on a cassette tape and attain automatic sensing of the desired music, a tape driving system is set in a fast-forward or rewind mode (hereinafter referred to as a "FF/REW mode"). More particularly, an operating rod is depressed and locked in a FF/REW position to allow a tape to run fast, and a cue signal of the desired music recorded on the tape is detected by a magnetic head. A plunger is energized upon detection of the cue signal to release the operating rod locked in the FF/REW position into a normal playback position for allowing a normal playback mode operation.

In such a lock-releasing mechanism as described above, there has been proposed to use a plunger of an auto-reverse mechanism also for a lock-releasing mechanism. This proposal, however, involves some problems. In especial, due to double use of a single plunger, the changeover operation of the auto-reverse mechanism is inevitably caused when the FF/REW operating rod is released upon energization of the plunger by the cue signal. As a result, the track is also changed over, and the desired music cannot be heard.

SUMMARY OF THE INVENTION

It is therefore an object of the present invention to provide a lock-release mechanism for a magnetic record/playback apparatus, which is capable of obviating the disadvantage of the conventional lock-release mechanism.

In accordance with the present invention, there is provided a lock-releasing mechanism for a magnetic record/playback apparatus, which comprises:
- a magnetic tape auto-reverse means;
- a FF/REW-operating means;
- a plunger for actuating said auto-reverse means;
- a lock means for locking said FF/REW-operating means in a FF/REW position;
- a lock-releasing means interlocked with said plunger upon energization of the plunger for automatic music sensing operation to release the locking of the lock means; and
- a regulating means interlocked with said FF/REW-operating means for restricting the pulling stroke of the plunger when energized for the automatic music sensing operation.

BRIEF DESCRIPTION OF THE DRAWING

FIG. 1 is a perspective view of one form of lock-releasing mechanism according to the present invention; and FIGS. 2 and 3 are perspective views of a stopper employed in the present invention, illustrating it in normal and actuated positions, respectively.

DESCRIPTION OF THE EMBODIMENT

Referring now to the drawing, there is illustrated a preferred embodiment of the present invention. In FIG. 1, 1 is a FF-operating rod operable by a known FF-operating mechanism 15, 2 is a REW-operating rod operable by a known REW-operating mechanism. Each of the FF-operating rod 1 and the REW-operating rod 2 has a pushing portion 3 for pushing a FF/REW-pin P in a direction indicated by an arrow in FIG. 1.

This FF/REW-pin P is interlocked, in a conventional manner, to a tape driving system comprising a pinch roller, an idler, etc. and to a head plate 17. When the FF/REW-pin P is displaced in the direction of the arrow, the tape driving system and the head plate are put into a FF/REW mode (automatic music sensing mode).

A locking cutout 4 is formed at a rear end of each of the FF-operating rod 1 and the REW-operating rod 2. This cutout 4 is engageable with a locking roller 6 provided at an end of an off-plate 5. More specifically, the off-plate 5 is arranged so as to extend in a direction perpendicular to the length of the FF- and REW-operating rods 1 and 2, and the locking roller 6 is provided on a lower face of the off-plate 5 so as to extend vertically downwardly. The off-plate 5 has an elongated slot 8 extending along the length thereof which slot is engaged with a guide pin 7 fixed to a deck plate, so that the off-plate 5 is adapted to be displaced while being guided by the pin 7. A spring 10 is provided between the off-plate 5 and a pin 9 provided on the deck plate so as to normally bias the off-plate 5 in the direction as indicated by an arrow in FIG. 1, for normally urging the locking roller 6 of the off-plate 5 towards the FF- and REW-operating rods 1 and 2.

Another end of the off-plate 5 is engaged with a tracting plate 11, and an end of this tracting plate 11 is connected to a plunger 12. This plunger 12 has two functions, such as lock-releasing of the automatic music sensing mechanism and changeover of the auto-reverse mechanism. When the plunger 12 is pulled by a full stroke, the auto-reverse mechanism 18 is subjected to a changeover operation by a conventional manner.

A stopper 13 is provided adjacently to the off-plate 5 for restricting the displacement of the off-plate 5 in the automatic music sensing mode. This stopper 13 is configured generally in V-shape and, for example, rotatably fitted to the guide pin 7. More specifically, one side of the V-shaped stopper 13 has a section of L-shape as can be seen from FIGS. 2 and 3. A vertically bent portion of the L-shaped side forms a receiving portion 13a adapted to receive the ends of the FF- and REW-operating rods 1 and 2. Another side of the V-shaped stopper 13 is bent, at a tip end thereof, to form a regulating portion 13b which is adapted to abut against the end of the off-plate 5. A spring 14 is provided between the stopper 13 and the deck plate to normally bias the stopper 13 in a pulled position for keeping the stopper 13 from the off-plate 5.

The so arranged lock-releasing mechanism of the present invention will operate as follows:

During a normal tape running mode, the FF- and REW-operating rods 1 and 2 are not depressed, so that the stopper 13 is in a position pulled by the spring 14 without being actuated by the operating rods 1 and 2. At this time, the regulating portion 13b of the stopper 13 is in a position disengaged from the off-plate 5, so that the off-plate 5 is free to reciprocate. Under these circumstances, if a signal for auto-reverse operation is applied to the plunger 12, the plunger 12 is pulled by a full stroke without any restriction so that changeover of the auto-reverse mechanism 18 is attained.

On the other hand, when one of the FF- and REW-operating rods 1 and 2 (the FF-operating rod 1 in FIG. 3) is depressed for carrying out an automatic music sensing operation, the FF/REW-pin P is pushed in the direction of the arrow mark by the pushing portion 3 formed on the operating rod. As a result, the tape driving system and the head plate 17 are set in automatic music sensing positions, respectively. Upon depression of the operating rod, the locking roller 6 of the off-plate 5 enters the locking cutout 4 formed on the end portion of the operating rod. Thus, the operating rod is locked in the depressed position for establishing the automatic music sensing mode. Since the off-plate 5 is biased by the spring 10, the locking roller 6 is firmly received in the cutout 4.

In addition, upon depression of the operating rod, the rear end of the operating rod pushes the receiving portion 13a of the stopper 13 so that the stopper 13 rotates against the action of the spring 14. As a result, the regulating portion 13b of the stopper 13 is brought into abutment against the end of the off-plate 5.

Under these conditions, if the plunger 12 is energized to be pulled by the cue signal, the off-plate 5 connected to the plunger 12 through the tracting plate 11 is moved, so that the locking roller 6 at the end of the off-plate 5 is disengaged from the cutout 4 and the operating rod is reset to its original position. Thus, the tape resumes the normal playback feeding mode. In this connection, it is to be noted that when the off-plate 5 is moved to a position where the lock of the operating rod is released, the end of the off-plate 5 is brought into engagement with the regulating portion 13b of the stopper 13 and the off-plate is prevented from further displacement. As a result, the plunger 12 connected to the off-plate 5 is not pulled by a full-stroke and accordingly, the auto-reverse mechanism connected to the plunger 12 is not actuated.

As described above, according to the present invention, the pulling stroke of the plunger is restricted, in the automatic music sensing mode, by the stopper interlocked to the FF- and/or REW-operating rod, so as not to effect changeover of the auto-reverse mechanism upon energization of the plunger. Thus, this invention enables double use of one plunger, i.e., a use for changeover of the auto-reverse mechanism and a use for lock-releasing of the automatic music sensing mechanism. This is advantageous to reduce the number of parts required and simplify the structure of the mechanism. In addition, this invention may suitably be applied to an existing auto-reverse type take deck to impart a lock-releasing function thereto simply by adding the stopper to the existing tape deck.

The invention is not limited to the embodiment as described above. For example, the stopper may alternatively be provided at other position than the guide pin of the off-plate. Instead of the end of the FF- and/or REW-operating rod, another portion of the operating rod or another member interlocked with the operating rod, e.g., head plate, may be used to push the stopper. Further alternatively, the tracting plate or plunger per se may be adapted to engage with the regulating portion of the stopper, because the stopper is provided for restricting the pulling stroke of the plunger.

We claim:

1. A lock-releasing mechanism for a magnetic record/playback apparatus, which comprises:
    a magnetic tape auto-reverse means;
    a fast forward and fast rewind-operating means;
    a plunger for actuating said auto-reverse means, said plunger being adapted to be energized for auto-reverse operation and for automatic music sensing operation and having an actuation stroke associated therewith;
    a lock means for locking said fast forward and fast rewind-operating means in a fast forward and fast rewind position;
    a lock-releasing means interlocked with said plunger to release the locking of the lock means upon energization of said plunger for automatic music sensing operation; and
    a regulating means interlocked with said fast forward and fast rewind-operating means for restricting the actuating stroke of said plunger when energized for the automatic music sensing operation so that said auto-reverse means is kept inoperative, said fast forward and fast rewind-operating means being comprised of a fast forward operating member and a fast rewind operating member and said lock means is engageable with said operating members, said lock means including an off-member, each of said operating members having a locking cutout engageable with said roller, said regulating means including a stopper member pivotally supported on said off-member and a spring member for normally biasing said spring member to keep it in an inoperative position.

2. A mechanism according to claim 1, wherein said lock-releasing means includes a tracting member interlocked to said plunger, said tracting member being adapted to displace said off-member to disengage said roller from said cutout.

3. A mechanism according to claim 1, wherein said stopper member has a receiving portion and a regulating portion, said receiving portion being adapted to be pushed by the operating members and said regulating portion being adapted to abut against the end of said off-member.

* * * * *

UNITED STATES PATENT AND TRADEMARK OFFICE
CERTIFICATE OF CORRECTION

PATENT NO. : 4,402,020
DATED : August 30, 1983
INVENTOR(S) : Tadashi Yokota et al.

It is certified that error appears in the above-identified patent and that said Letters Patent is hereby corrected as shown below:

Column 4, line 38, after "off-member" insert -- and a locking roller provided at an end of said off-member --.

Column 4, line 43, "spring" should read -- stopper --.

Signed and Sealed this

Twenty-seventh Day of March 1984

[SEAL]

Attest:

GERALD J. MOSSINGHOFF

Attesting Officer    Commissioner of Patents and Trademarks